United States Patent [19]

Jennrich et al.

[11] Patent Number: 5,460,439
[45] Date of Patent: Oct. 24, 1995

[54] SEALED TRANSFER SYSTEM

[75] Inventors: Carleton E. Jennrich, Welch; Richard H. Adams; Rudolph O. Marohl, both of Red Wing, all of Minn.

[73] Assignee: Delaware Capital Formation, Inc., Wilmington, Del.

[21] Appl. No.: 178,917

[22] Filed: Jan. 7, 1994

[51] Int. Cl.$^6$ ................................................ A61G 11/00
[52] U.S. Cl. ................................................................ 312/1
[58] Field of Search ........................... 312/1; 137/614.01; 600/21

[56] References Cited

U.S. PATENT DOCUMENTS

| | | |
|---|---|---|
| 3,289,698 | 2/1966 | Cazalis et al. |
| 4,010,588 | 3/1977 | Eisert. |
| 4,141,609 | 2/1979 | Eisert. |

FOREIGN PATENT DOCUMENTS

| | | | |
|---|---|---|---|
| 2102719 | 2/1983 | United Kingdom | 312/1 |
| 2262786 | 6/1993 | United Kingdom | 312/1 |

Primary Examiner—Kenneth J. Dorner
Assistant Examiner—Gerald A. Anderson
Attorney, Agent, or Firm—Burd, Bartz & Gutenkauf

[57] ABSTRACT

A sealed system is provided for facilitating the transfer of material through a port in a barrier wall separating two different environments without contamination of the cleaner of the two environments by the dirtier. The system includes a door closing a port in the barrier wall in leak-proof sealed engagement. A transfer medium for containing or receiving the material to be transferred through the port is provided with a removable cover in leak-proof sealed engagement within a transfer medium ring connectable in leak-proof sealed engagement with a stationary ring defining the passage through the barrier wall which is closed by the door. Sealing rings are provided between the door and transfer medium cover, and between the transfer medium ring and stationary ring to ensure against passage of contaminants from one environment to the other. For certain pharmaceutical applications, a heating element is provided in the stationary ring to sterilize the interfaces between abutting parts.

19 Claims, 5 Drawing Sheets

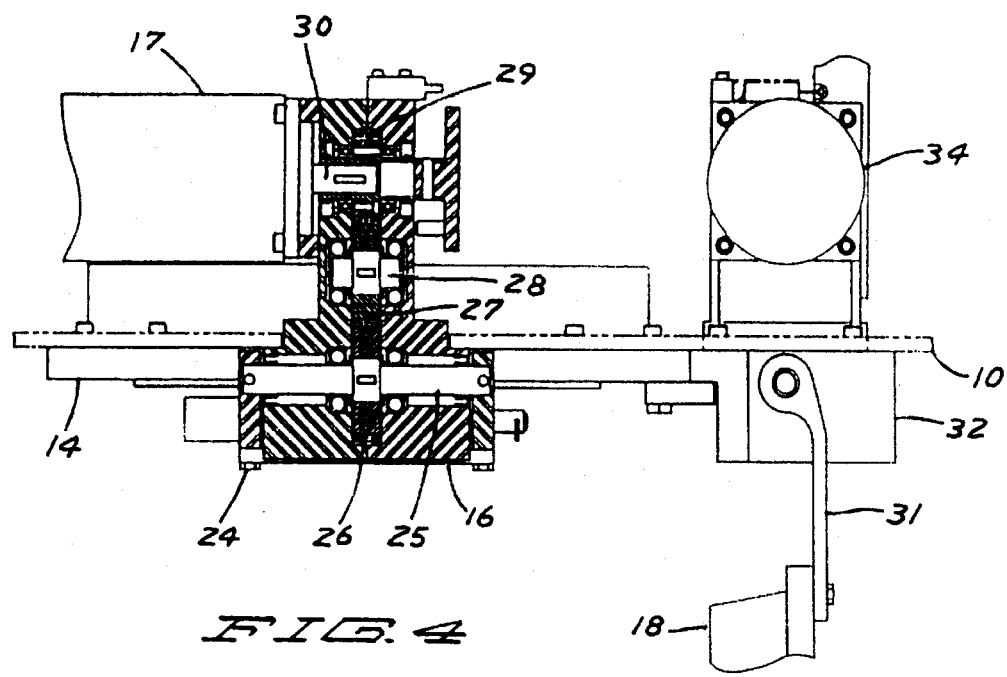
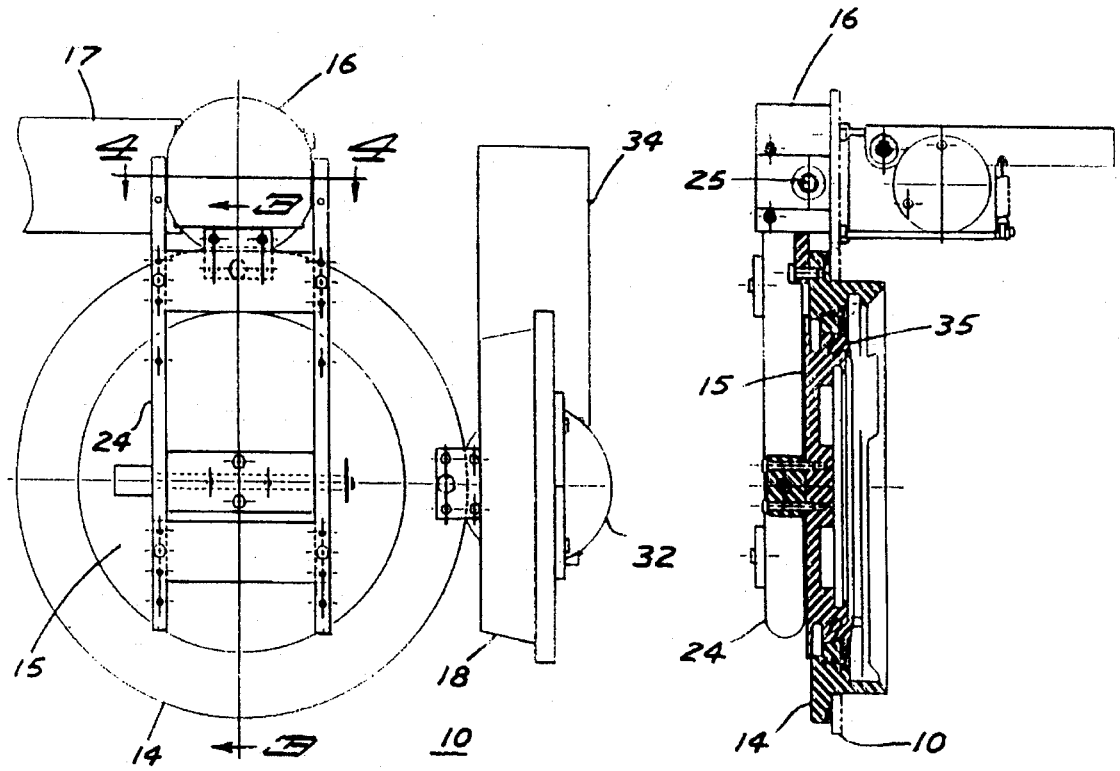

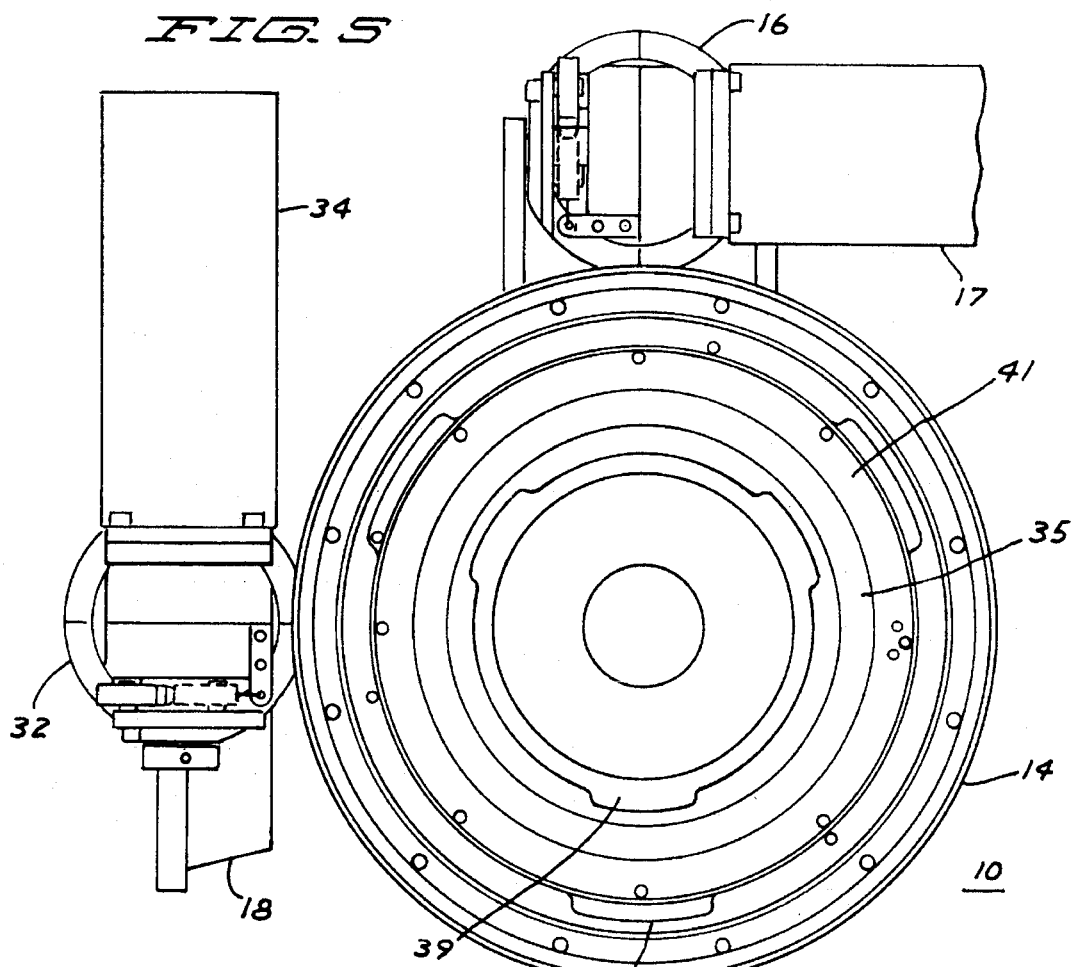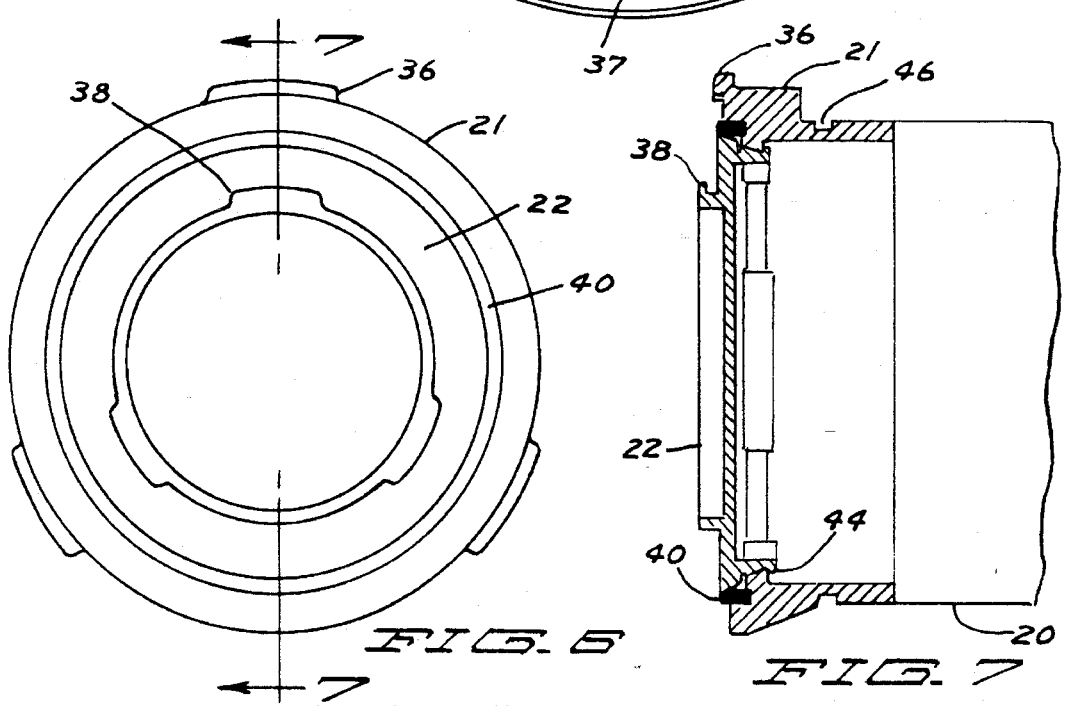

5,460,439

SEALED TRANSFER SYSTEM

BACKGROUND OF THE INVENTION

FIELD OF THE INVENTION

This invention relates to a sealed system for facilitating the transfer of material through a port in a barrier wall separating two different environments without contamination of the cleaner of the two environments by the dirtier. For example, in the case of certain pharmaceutical or chemical procedures, or assembly of medically related devices, in a "clean" or isolation area, it is often desired to pass materials into the clean area without risk of contamination of the clean area by dust or bacteria or viruses in the outside ambient air, which is the dirtier of the two environments. On the other hand, in the case of radioactive hot cells, or isolation chambers in which bacteriological procedures are being carried out, the environment within the isolation chamber is the dirtier, as compared to the cleaner ambient outside air.

In recent years, in the pharmaceutical industry, because of the high expense of maintaining so-called "clean rooms" into which persons may enter to carry out required procedures, more and more operations are being carried out inside smaller isolation chambers, in the nature of glove boxes, which do not require entry of work persons. However, the requirement remains for transferring materials into and out of the isolation chamber without contamination of the cleaner interior environment by the dirtier ambient atmosphere surrounding the isolation chamber.

Although the invention is described with particular reference to its use in the pharmaceutical industry, it will be understood that the system is equally applicable to nuclear, medical devices, and other operations requiring transfer of materials through a barrier wall without intermingling of the environments on opposite sides of a separating barrier wall.

THE PRIOR ART

Cazalis U.S. Pat. No. 3,289,698 discloses one means for effecting a leak-tight coupling between two environments without contamination of one by the other.

Eisert U.S. Pat. No. 4,010,588 and No. 4,141,609 disclose systems for effecting access into sealed enclosures, as with gloves, without exposing the interior of the enclosure to the outside atmosphere, or vise versa.

SUMMARY OF THE INVENTION

Broadly stated, the invention comprises a sealed system for facilitating the transfer of material through a port in a barrier wall separating two different environments without contamination of the cleaner of the two environments by the dirtier. The system includes a stationary first flanged ring extending through a port in a barrier wall separating two different environments in leak-proof sealed engagement with the periphery of the port and having a first passage through the ring. A hinged door on one side of the barrier wall is moveable from a first closed position in the first passage in leak-proof sealed engagement with the inside perimeter of the first flanged ring to a second open position free of the first passage through the first flanged ring. A transfer medium on the other side of the barrier wall, which may take the form of a rigid canister, a flexible bag, another isolation chamber or a glove, has a second flanged ring having a second passage through it, the second ring being engageable in leak-proof sealed engagement with the first flanged ring. A cover for the transfer medium is fitted in leak-proof sealed engagement with the second passage through the second flanged ring. Complementary locking means are provided on the first and second flanged rings for rigidly securing those rings together in leak-proof sealed engagement. The material to be transferred is contained within the transfer medium for passage into the connected isolation area, or material from the isolation area may be transferred through the barrier wall into the transfer medium.

BRIEF DESCRIPTION OF THE DRAWINGS

The invention is illustrated by the accompanying drawings in which corresponding parts are identified by the same numerals and in which:

FIG. 2 is an elevational view of the transfer system from the distal or inner side of an isolation area;

FIG. 3 is a section on the line 3—3 of FIG. 2 and in the direction of the arrows;

FIG. 4 is a section on the line 4—4 of FIG. 2 and in the direction of the arrows;

FIG. 5 is an elevational view from the opposite proximal or outer side of the isolation area, shown without a transfer medium in place;

FIG. 6 is an end elevational view of one form of transfer medium, i.e., a rigid canister;

FIG. 7 is a fragmentary section on the line 7—7 of FIG. 6 and in the direction of the arrows;

DETAILED DESCRIPTION OF THE PREFERRED EMBODIMENT

Figure 1:
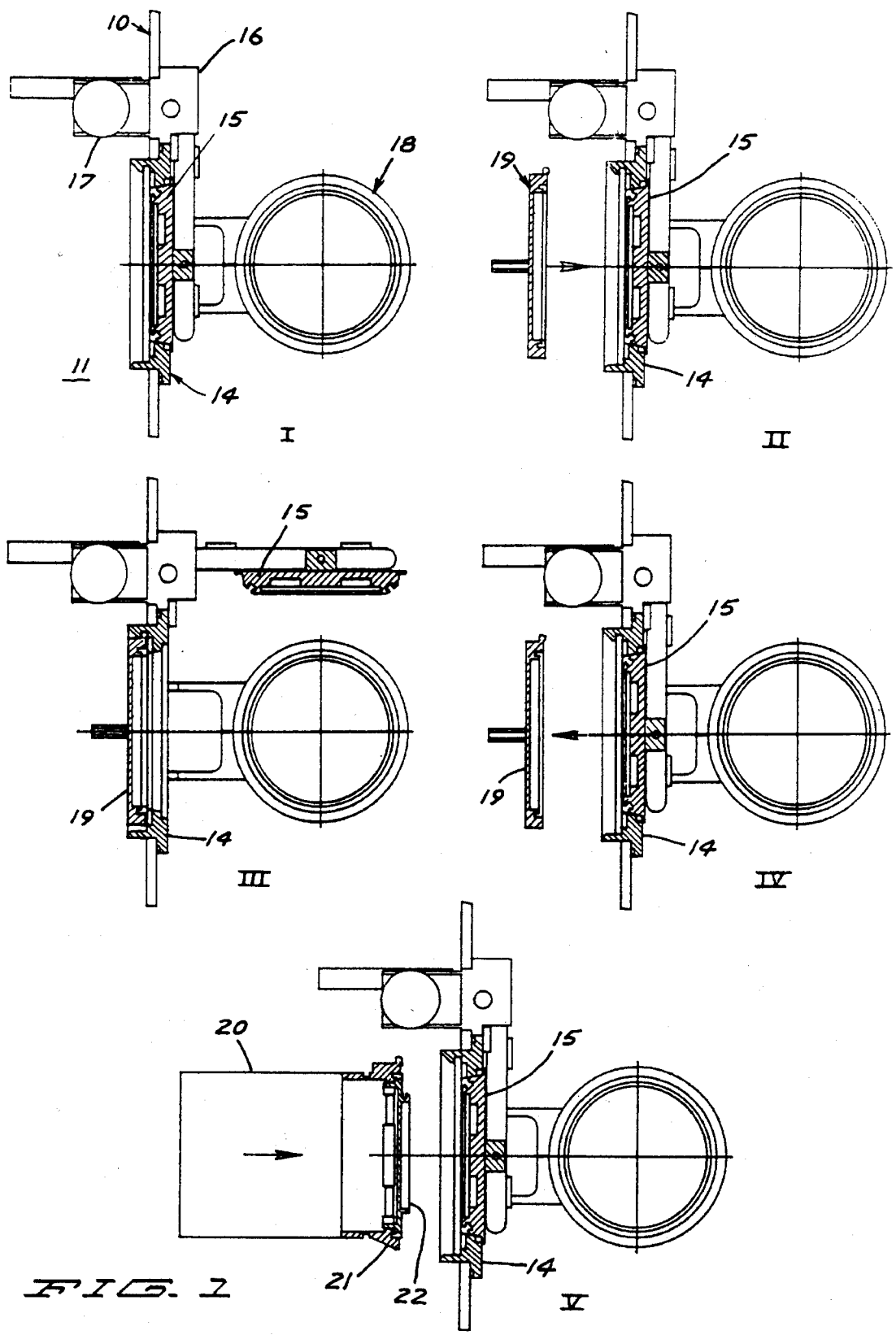
FIGS. 1 and 1A illustrate schematically the sequence of operating steps by which material is transferred from an exterior canister into an enclosed clean isolation area, particularly as practiced in the pharmaceutical industry.
Figure 1A:
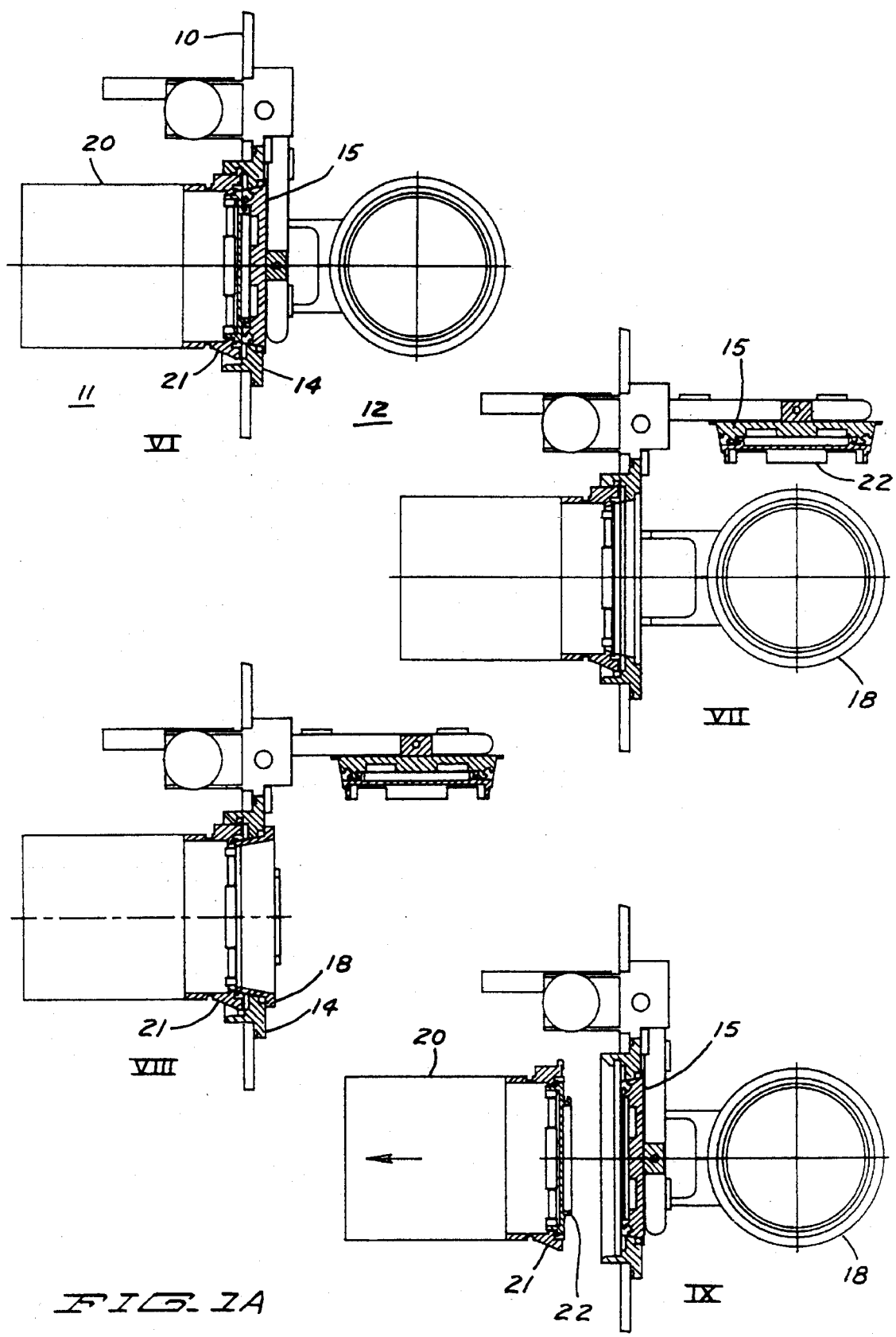

Referring now to the drawings and particularly to FIGS. 1 and 1A there is shown schematically the sequence of steps utilizing the transfer system to transfer material from the outside of a barrier wall of an isolation chamber to the inside of that chamber without contamination of the chamber by the outside ambient environment, as practiced in the pharmaceutical industry. In the schematic diagram of each step a barrier wall 10 separates an outside or "dirty" environment 11 from an inside or "clean" environment 12 on the other, as shown at step I. For convenience the outside of the isolation chamber is designated as the proximal side and the inside is designated as the distal side.

As described in detail herebelow, in connection with FIGS. 2–5, 8 and 9, a stationary first flanged ring 14 extends through a port in barrier wall 10 in fixed leak-proof sealed engagement with the periphery of the port. The ring defines a first passage which extends through the wall. A hinged door 15 is located on the distal side of wall 10. Door 15, shown in closed position in leak-proof sealed engagement with the inside perimeter of flanged ring 14 in step I, is moveable to an open position free of the passage as shown in step III.

Door 15 is connected to a gear box 16 extending through wall 10 in leak-proof sealed relation thereto. Although the door 15 may be operated manually from the proximal side of the wall 10, preferably it is operated by a motor 17 connected to the input shaft of the gear box. As described hereinafter, an optional, but desirable, hinged protective collar 18 is provided on the distal side of wall 10. Collar 18 is moveable from a first position free of the passage through ring 14 to a second position within that passage, when the door is open. The components of the system are shown in step I in position just prior to initiating a transfer operation.

With door 15 closed, a separable solid impermeable port sterilization cover 19, as shown in step II, is locked in leak-proof sealed engagement in the proximal side of ring 14. When this is done potentially contaminating ambient air is trapped in the space at the interface between cover 19 and door 15.

With sterilization cover 19 in place, as shown in step III, door 15 is opened. The isolation area 12 is purged of any contamination by sterilization of the isolation enclosure by steam or by vaporous hydrogen peroxide or similar chemical sterilant. At this time, the inside of sterilization cover 19 is sterilized along with all surfaces of door 15 and the wall of the passage through ring 14.

Door 15 is then closed, as shown at step IV, and sterilization cover 19 is removed. All of door 15 remains sterile except for the proximal side which becomes exposed to ambient air when the sterilization cover is removed. The system is now ready for docking of a transfer medium in ring 14. As shown in step V a transfer medium in the form of a canister 20 is positioned to dock in ring 14. Canister 20 includes a flanged ring 21, designated as the second ring and described in detail hereinafter in connection with FIGS. 6–9. Ring 21 is engageable in leak-proof sealed relation in ring 14, with door 15 remaining closed.

Although shown as a canister, the transfer medium may take a variety of forms, depending upon particular transfer needs. For example, rubber septums for vials for containing injectable medications are commonly sterilized in bulk in a porous flexible bag, made of a material such as du Pont Tyvek. The system may be used to sealably interconnect two similar isolation chambers having the same interior environment while protecting them from the surrounding ambient environment. Rubber gloves may likewise be introduced into an isolation chamber to permit manual operations to be performed while maintaining the integrity of the environment of the isolation chamber.

Figure 8:
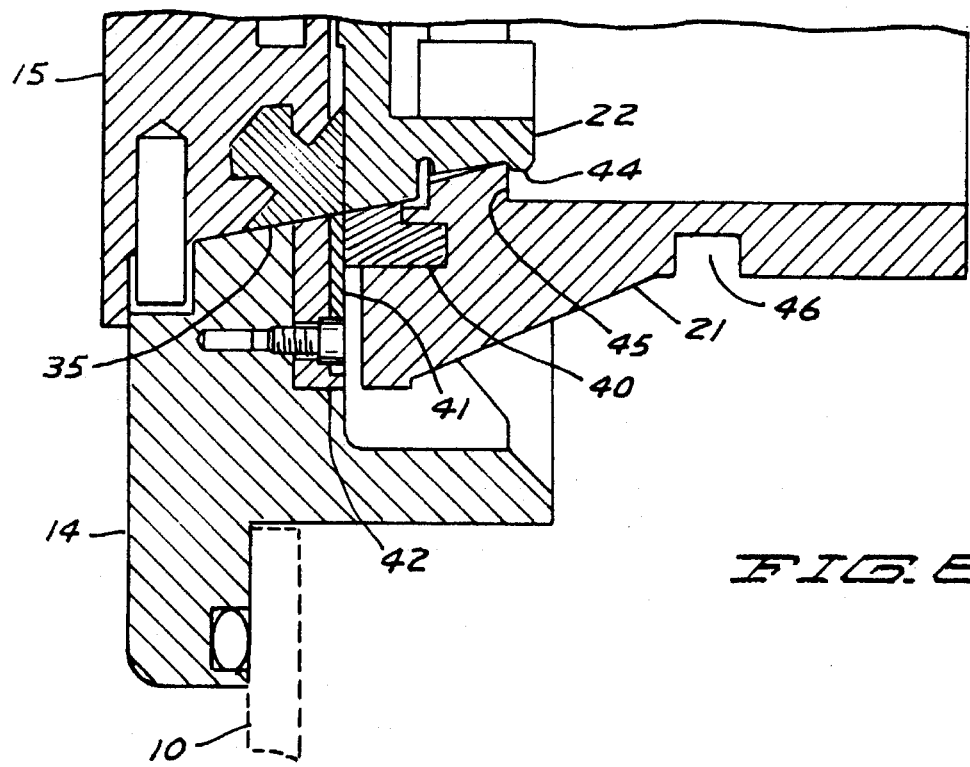
FIG. 8 is a fragmentary sectional view, on an enlarged scale, showing the sealing engagements between components of the transfer system.

The entrance to canister 20, which is through a passage in flanged ring 21, is closed by a cover 22 in sealed leak-proof engagement with the inner perimeter of ring 21. When canister 20 is docked, as shown at step VI, with flanged ring 21 in sealed leak-proof engagement with flanged ring 14 in the barrier wall, canister cover 22 is also in sealed leak-proof engagement with the proximal side of door 15. At this time, as best seen in FIG. 8, the interfaces between rings 14 and 21 and between the canister cover 22 and the proximal surface of door 15 are potentially contaminated by the ambient air on the outside of the isolation chamber. Because the facing surfaces are in sealed leak-proof engagement, the only possible sources of contamination are the exterior surfaces where the sealed mating surfaces meet. To provide maximum assurance of sterility, these interfaces are subjected to a short period of intense dry heat to neutralize any contaminant which may be present.

After the heat sterilization of step VI door 15 is opened and swung out of the way of the passage through ring 14, carrying attached canister cover 22 with it, as shown at step VII. At this time the passages through the rings 14 and 21 are open and the sterile environment within the canister is exposed to the sterile environment within the isolation chamber. Preferably protective collar 18 is provided and, as shown in step VIII, is swung into place within the passage in ring 14 closely spaced from the perimeter of that ring. Collar 18 is smooth surfaced to facilitate easy transfer of the canister contents into the isolation chamber. While optional, protective collar 18 is desirable and performs the function of ensuring the integrity of the seal between the flanged rings from possible disruption due to contact with whatever material is being transferred. At the same time, the material being transferred is protected against possible abrasion by the interior passage wall of ring 14.

When the transfer is completed collar 18 is swung out of the way and door 15 is closed. Upon closing of the door canister cover 22 becomes re-engaged in the passage in canister ring 21 and is removed with the canister when it is disengaged, as shown at step IX.

Further successive transfers may be made simply by docking a succession of canisters containing sterile material to be transferred and repeating steps V–IX until the operation being performed within the isolation chamber is completed. Although the system is described with reference to the transfer of material into an isolation chamber, the same series of steps is carried out in transferring materials from within the isolation chamber to the outside.

Referring now to FIGS. 2–5, 8 and 9, the structure of the passage through the barrier wall, and associated accessories, is shown in greater detail. In FIGS. 2–5 the system is shown with door 15 closed as in steps IV and V of FIG. 1. The first annular flanged ring 14 is mounted in leak-proof sealed engagement with barrier wall 10 separating two different environments. Wall 10 is often transparent and FIG. 2 shows the ring mounted in a transparent wall with certain elements on the opposite side of the wall visible. Door 15 is supported by a pair of parallel spaced apart arms 24, the opposite ends of which are fixedly secured to the ends of an output shaft 25 in sealed gear box 16. An output gear 26 is keyed to shaft 25 and meshes with an idler gear 27 on idler shaft 28 journaled in the gear box. Idler gear 27 in turn meshes with input gear 29 keyed to driven input shaft 30. Although shaft 30 may be rotated manually to open and close door 15, it is preferably driven by electric motor 17 or a hydraulic or pneumatic motor.

Protective collar 18 is similarly supported by a pair of arms 31 rigidly secured to the ends of the output shaft of a sealed gear box 32 similar to gear box 16 and extending through barrier wall 10 in leak-proof sealed engagement therewith. The input shaft of gear box 32 may likewise be driven manually but preferably driven by electric motor 34 or a hydraulic or pneumatic motor.

As best seen in FIG. 8, door 15 maintains a leak-proof sealed engagement with the interior wall of the passage through ring 14 by virtue of a resilient sealing ring or gasket 35, preferably formed from heat resistant silicone rubber, which engages the passage wall. When the cover 22 of a transfer medium such as canister 20 is brought into engagement with door 15, as in step VI in FIG. 1A, sealing ring 35 likewise engages the face of cover 22 in leak-proof sealed engagement therewith.

When the canister 20 is docked as shown in step VI, ears 36 of the canister ring 21 engage notches 37 of ring 14. At the same time ears 38 of canister cover 22 engage notches 39 on the proximal side of door 15 and the canister ring and cover are rotated in a bayonet lock connection. Annular sealing ring or gasket 40, also preferably formed from heat resistant silicone rubber, surrounding the passage through the canister sealed ring engages cover 22 in leak-proof sealed engagement and, when the canister is locked in place in ring 14, engages the ring surface in leak-proof sealed engagement.

Prior to docking of the canister, the proximal surface of door 15 and the outer surfaces of canister ring 21 and cover 22 are exposed to the air and subject to possible contamination by airborne organisms. After docking atmospheric air is sealed against entry into the system by virtue of sealing ring 40 and atmospheric air trapped between door 15 and canister cover 22 is sealed therein by sealing ring 35. The only possible means of contamination is from the outermost edges of the interface between seal ring 35 and canister cover 22 and the innermost edges of the interface between seal ring 40 and ring 14.

To maintain maximum integrity of the system against possible contamination, a resistive heating element 41 is provided on the proximal side of flanged ring 14 surrounding the passage through the ring, at the interface with canister sealing ring 40 and adjacent the interface between door sealing ring 35 and canister cover 22. Heating element 41 is insulated from ring 14 by a flat annular ring 42 of ceramic insulating material. Heating element 41 is connected to a source of electric power and upon activation is designed to generate heat of approximately 400 degrees Fahrenheit which, when maintained for a period of about 30 seconds, ensures destruction of any organisms which might be present in the interfaces between sealing rings 35 and 40 and their abutting surfaces. As a comparison, when steam is used as the sterilant, exposure for at least 30 minutes is required.

Heating element 41 is preferably of the type utilizing thin film heat technology using a ceramic metal "Cermet" paste, or etched foil attached to a conductive stainless steel substrate.

As best seen in FIG. 8, canister cover 22 is held in leak-proof sealed engagement in the opening in canister ring 21 by frictional engagement. Canister ring 21 and cover 22 are preferably formed of a rigid disposable synthetic resinous material, such as polyethylene. When, after the interface heat sterilization step has been completed, door 15 is opened, cover 22 being locked to the door by its bayonet connection is pulled out of the canister ring. The innermost rim of the cover distorts slightly to free annular bead 44 from the lip 45 forming part of the passage through canister ring 21.

Figure 9:
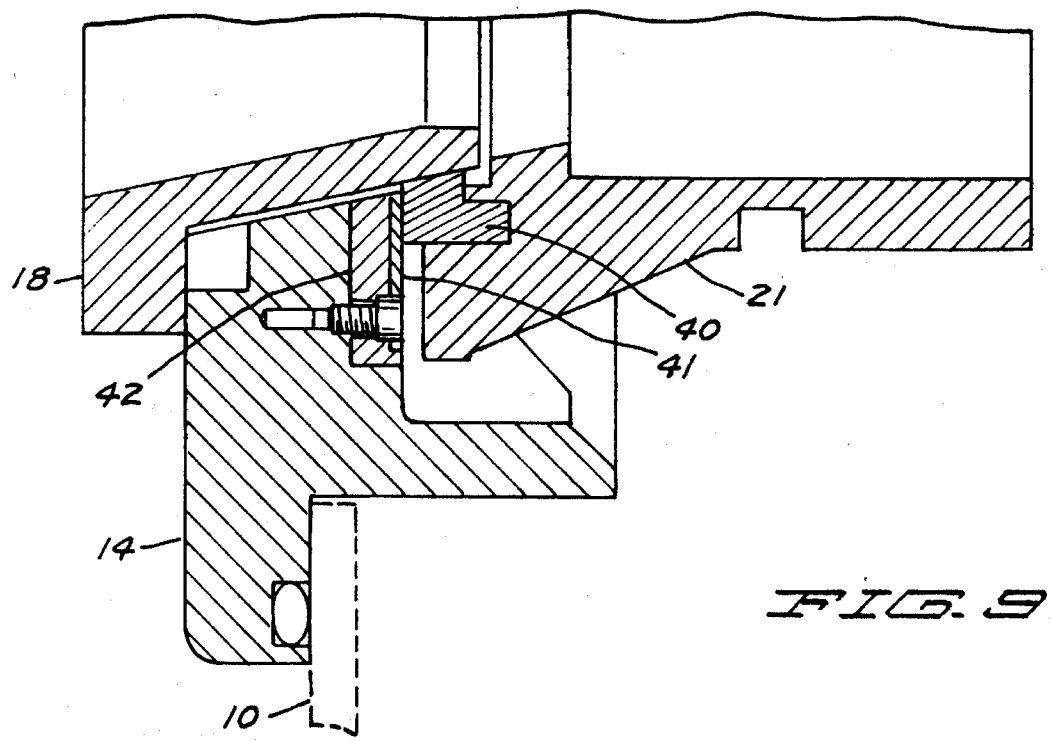
FIG. 9 is a similar fragmentary section, on an enlarged scale, of the system in condition for transfer of material.

When door 15 is opened and swung out of the way of the passage through ring 14, the interior of canister 20 is available for access through the passage. Motor 34 is energized to rotate protective collar 18 into the passage in ring 14, as shown at step VIII of FIG. 1 and in FIG. 9. Collar 18 is closely spaced from the wall of the passage through ring 14 and is in leak-proof sealed engagement with sealing ring 40 of canister ring 21, as shown in FIG. 9. The contents of the canister may then be passed through collar 18 into the isolation area. This transfer may occur by operators using gloves in the manner of a conventional glove box, or, where the transfer medium is a flexible bag, that bag may be manipulated from outside the isolation chamber to dump the contents into a receiving hopper or the like adjacent the passage through the barrier wall. Optionally, the proximal end of collar 18 may be provided with a sealing ring, formed for example from silicone rubber, for engagement with the canister ring for maximum protection against contamination of the sterile environment of the isolation area. Protective collar 18 ensures against any disruption of the seal between ring 14 and canister ring 21 by passage of the contents of the transfer medium into the isolation area, while at the same time protecting those contents from possible abrasion by contact with the interior passage in ring 14.

When the transfer medium is a porous bag, after sterilization of the contents, the entire bag, including the canister ring to which it is attached, and the cover are encased in an impermeable flexible synthetic resinous bag, such as polyethylene, to maintain the sterility within the bag. The outer protective sheath is secured to the canister ring, as by means of an o-ring or equivalent fastening means positioned in channel 46 in the canister ring. Then, just prior to docking of the canister in ring 14, the end of the outer protective bag is cut to expose the engaging surfaces of the canister ring and cover while maintaining the sterility of the inner bag and its contents. When the system is used to introduce a glove into the isolation area to perform manual sterility of the inner bag and its contents. When the system is used to introduce a glove into the isolation area to perform manual manipulations, the open end of the glove is secured to canister ring 21, held in place by means of an o-ring or similar fastening means engaging channel 46, and reversed and passed through the passages in rings 21 and 14 when door 15 is opened.

The transfer system is provided with appropriate controls including sensors, temperature read-out, timers, alarms to signal underheating or overheating or loss of integrity within the system, motor interlocks to ensure against premature opening or closing of the door or rotation of the protective collar, and the like, as well understood within the control parts.

Although the system as illustrated is shown in place in a vertical wall with the door opening upwardly and the protective collar being rotated horizontally, dependent upon needs the system may be utilized in horizontal or sloping walls and the orientation of the door and protective collar may be varied. For use in nuclear applications, the heat sterilization element is unnecessary and may be deleted. For some operations, where only a single transfer is made between sterilizations of the isolation area, the use of sterilization cover 19, as in steps II–IV of FIG. 1 may be eliminated. Instead, a modified canister having a cover without door interlock means is substituted for the sterilization cover in these steps. When the door is opened as in step III and the isolation chamber is sterilized, the canister cover is likewise sterilized. Then, without closing the door, the canister cover may be manually removed and the transfer effected.

The permanently installed parts of the transfer system including ring 14, door 15, protective collar 18, and housings of gear cases 17 and 32 are desirably formed from stainless steel.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A sealed system for facilitating transfer of material through a port in a barrier wall separating two different environments, a first environment on one side of said wall being different than a second environment on the second side of the barrier wall, without contamination of the first environment by the second environment, said system comprising:

A) a first flanged ring having an inside and outside perimeter extending through a port in the barrier wall separating two different environments, said port having an inner periphery, and the outside perimeter of said first ring being in leak-proof sealed engagement with a periphery of said port and having a first passage through the ring;

B) a hinged door on said one side of said barrier wall moveable from a first closed position in said first passage in leak-proof sealed engagement with an inside perimeter of said first flanged ring to a second open position free of the first passage through said ring;

C) a first sealed gear box for moving said door extending through said barrier wall in leak-proof sealed relation to said barrier wall said gear box including at least a driven input shaft on the side of said barrier wall opposite from said door and a mechanically interconnected output shaft on the second side of the wall rigidly connected to said door;

D) a transfer medium on the side of said barrier wall opposite from said door having a second flanged ring with an inside and outside perimeter, the outside perimeter of said second ring being connectable in leak-proof sealed engagement with the inside perimeter of said first flanged ring and said second ring having a second passage therethrough;

E) a cover for said transfer medium in leak-proof sealed engagement with the second passage through said second ring; and F) complementary locking means on said first and second flanged rings for rigidly securing said rings together in leak-proof sealed engagement.

2. A transfer system according to claim 1 wherein said transfer medium is a rigid canister, a flexible bag, an isolation chamber or a glove.

3. A transfer system according to claim 1 wherein:

A) said system includes a separable port sterilization cover connectable with said first flanged ring in leak-proof sealed engagement, and B) complementary locking means are provided on said sterilization cover engageable with the locking means on said first flanged ring.

4. A transfer system according to claim 1 wherein complementary locking means are provided on the cover of said transfer medium and on one side of said door for rigidly securing the transfer medium cover to said door in rigid leak-proof sealed engagement.

5. A transfer medium according to claim 1 wherein:

A) said door includes a flexible gasket ring having a first face engageable with the first passage wall in said first flanged ring and a second face extending through said first passage, and B) said transfer medium cover includes a flat annular surface engageable with the second face of said door gasket ring in leak-proof sealed abutments.

6. A transfer system according to claim 5 wherein said first flange ring includes an annular resistive heating element in the wall of the first passage through the ring adjacent to the interface between the gasket rings of the door and the transfer medium cover.

7. A transfer system according to claim 1 wherein a hinged annular protective collar is provided on the same side of the barrier wall as said door, said collar being moveable from a first position free of the first passage through said first flanged ring to a second position within said first passage in closely spaced relation to the passage wall.

8. A transfer system according to claim 7 wherein the end of said protective collar extending into said first passage has a resilient gasket ring engageable with the perimeter of said second flange ring surrounding said second passage in leak-proof sealed abutment therewith.

9. A transfer system according to claim 7 wherein

A) a second sealed gear box spaced from said first gear box extends through said barrier wall in leak-proof sealed relation thereto, said gear box including at least a driven input shaft on the side of said barrier wall opposite from said protective collar and a mechanically interconnected output shaft on the collar side of the wall, and B) said protective collar is rigidly connected to said output shaft.

10. A transfer system according to claim 9 wherein said input shaft of said second gear box is connected to and driven by a motor.

11. A transfer system according to claim 1 wherein said input shaft of said first gear box is connected to and driven by a motor.

12. A sealed system for facilitating transfer of material through a port in a barrier wall separating two different environments, a first environment on one side of said wall being different than a second environment on a second side of the barrier wall without contamination of the first environment by the second environment, said system comprising:

A) a first flanged ring having an inside and outside perimeter extending through a port in the barrier wall separating the two different environments, said port having an inner periphery, and the outside perimeter of said first ring being in leak-proof sealed engagement with a periphery of said port and having a first passage through the ring;

B) a hinged door on said one side of said barrier wall moveable from a first closed position in said first passage in leak-proof sealed engagement with an inside perimeter of said first flanged ring to a second open position free of the first passage through said ring, said door including a flexible gasket ring having a first outer peripheral face engageable with the first passage wall in said first flanged ring and a second flat annular face extending through said first passage;

C) a separable port sterilization cover connectable with said first flanged ring in leak-proof sealed engagement and complementary locking means on said sterilization cover engageable with locking means on said first flanged ring;

D) a transfer medium on the other side of said barrier wall having a second flanged ring with an inside and outside perimeter, the outside perimeter of said second ring being connectable in leak-proof sealed engagement with the inside perimeter of said first flanged ring and said second ring having a second passage therethrough;

E) a cover for said transfer medium in leak-proof sealed engagement with the second passage through said second ring, said transfer medium cover including a flat annular surface engageable with the second flat annular face of said door gasket ring in leak-proof sealed abutment;

F) an annular resistive heating element having an inside and outside perimeter located in the wall of the first passage through the first flange ring, the inside perimeter of said heating element being adjacent an interface between the gasket ring of the door and the transfer medium cover;

G) complementary locking means on said first and second flanged rings for rigidly securing said rings together in leak-proof sealed engagement; and H) complementary locking means on the cover of said transfer medium and on one side of said door for rigidly securing the transfer medium cover to said door in rigid leak-proof sealed engagement.

13. A transfer system according to claim 12 wherein said transfer medium is a rigid canister, a flexible bag, an isolation chamber or a glove.

14. A transfer system according to claim 12 wherein a hinged annular protective collar is provided on the same side of the barrier wall as said door, said collar being moveable from a first position free of the first passage through said first flanged ring to a second position within said first passage in closely spaced relation to the passage wall.

15. A transfer system according to claim 14 wherein the end of said protective collar extending into said first passage has a resilient gasket ring engageable with the perimeter of said second flange ring surrounding said second passage in leak-proof sealable abutment therewith.

16. A transfer system according to claim 12 wherein:

A) a first sealed gear box extends through said barrier wall in leak proof sealed relation thereto, said gear box including at least a driven input shaft on one side of said barrier wall and a mechanically interconnected output shaft on the opposite side of the wall, and B) said door is rigidly connected to said output shaft.

17. A transfer system according to claim 10 wherein said input shaft of said first gear box is connected to and driven by a motor.

18. A transfer system according to claim 14 wherein

A) a second sealed gear box spaced from said first gear box extends through said barrier wall in leak-proof sealed relation thereto, said gear box including at least a driven input shaft on one side of said barrier wall and a mechanically interconnected output shaft on the opposite side of the wall, and B) said protective collar is rigidly connected to said output shaft.

19. A transfer system according to claim 18 wherein said input shaft of said second gear box is connected to and driven by a motor.

* * * * *

UNITED STATES PATENT AND TRADEMARK OFFICE
CERTIFICATE OF CORRECTION

PATENT NO.  : 5,460,439
DATED       : October 24, 1995
INVENTOR(S) : Carleton E. Jenrich et al It is certified that error appears in the above-indentified patent and that said Letters Patent is hereby corrected as shown below:

Column 10, line 8, "10" should be --16--.

Signed and Sealed this

Nineteenth Day of March, 1996

Attest:

BRUCE LEHMAN

Attesting Officer

Commissioner of Patents and Trademarks